June 17, 1924.
F. J. HERING
1,497,851
METHOD AND MEANS FOR MAKING LANTERN SLIDES
Filed Aug. 28, 1922
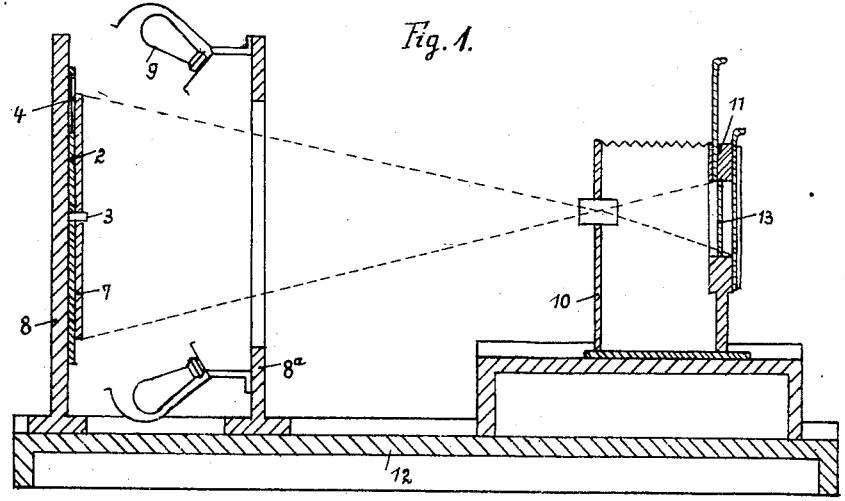
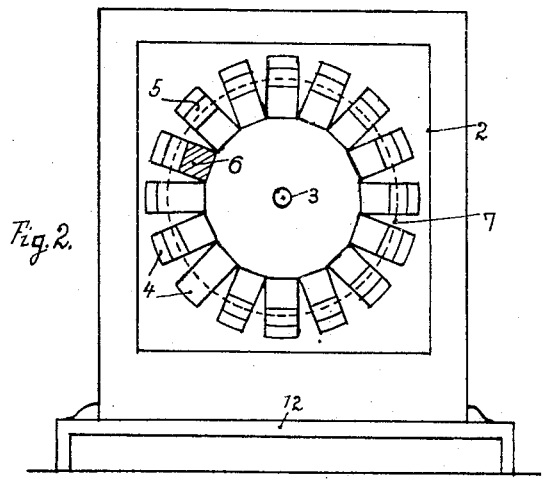
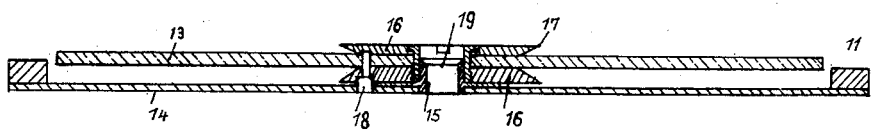

Patented June 17, 1924.

1,497,851

UNITED STATES PATENT OFFICE.

FRANZ J. HERING, OF ZURICH, SWITZERLAND.

METHOD AND MEANS FOR MAKING LANTERN SLIDES.

Application filed August 28, 1922. Serial No. 584,840.

*To all whom it may concern:*

Be it known that I, FRANZ JAKOB HERING, civil engineer, a citizen of Switzerland, and residing at Zurich, Switzerland, have invented certain new and useful Improvements in Methods and Means for Making Lantern Slides, of which the following is a specification.

My invention relates to novel and useful means for obtaining lantern slides for advertising purposes in such simple and reliable manner that the working may be done surely and quickly even by unskilled hands.

In the following specification and in the appended claims the texts, drawings, or the like which shall be reproduced and projected, are called "originals," while the part carrying the lantern slides is termed "slide carrier."

My invention is illustrated by way of example in the accompanying drawings, in which—

Fig. 1 is a vertical section of a device, adapted for producing combination lantern slides for use in projection, while Fig. 2 is a front view of the carrier for the originals, Figure 3 is a radial section of a modification of the slide carrier combined with the plateholder and of a larger scale.

Essential components of the exposing apparatus are the "original" carrier and the "slide" carrier. The former consists of a card board disc 2 which is supported upon a centering pin 3 and is provided with a circular series of recesses 4 into which the originals 5 (cards or the like bearing texts, pictures, drawings, newspaper news, or the like, 6,) are placed. A holding disc 7 consisting of transparent material insures the easy insertion and removal of the originals, as well as their correct position in the carrier 2.

The walls 8 and 8ª with the original carrier and the lamp 9, and the photographic camera 10 with the plate holder 11 for the slide carrier, are mounted, preferably displaceably, upon a common base plate 12. The slide carrier consists as shown in a more detailed and slightly modified manner in Figure 3 of a photographic plate 13, supported by a sleeve 15, mounted in a web or traverse 14, which is fastened to the plate-holder or frame 11; the sleeve 15 has two handles consisting of small metallic discs 16 with wedge shaped rims 17. The slide carrier permits very convenient handling when being inserted in the exposing or the reproducing apparatus, without necessitating or grasping it at its rim. This is of essential importance for the diameter of the projection apparatus which may thus be relatively small. A stepped pin 18 entering into correspondingly shaped bores of the parts 13 and 16 warrants that the disc 13 after having been placed upon the sleeve 15 is later on inserted in the proper position into the reproducing apparatus so that reproduction is started with the right slide and the centre of the slide coincides exactly with the optical axis of the reproducing apparatus.

The sleeve 15 contains a small ground glass disc 19 which is located in the plane of the sensitive layer of the photographic plate 13 after this latter has been inserted in the plate holder.

When using the exposing apparatus, the light of the lamp 9 is thrown upon the "originals" 5 and is reflected from them through the lens to the slide carrier 13. Thus negatives of all the originals are produced in one exposure upon the plate or slide carrier which is then developed in a well known manner and can be introduced at once into the reproducing apparatus. The pictures and the texts may be written or drawn upon the "original" carrier in any desired scale in order to be reproduced in the manner described. It is immaterial in which manner the originals have been produced and whether they are positives or negatives. If the originals are guided laterally or in some other way, the glass plate 7 may be dispensed with, whereby disturbing effects by reflection are obviated; such disturbances may occur if the size of the glass plate exceeds a certain limit.

The invention illustrated, by way of example, in the drawings and described with reference thereto, permits obviously of many modifications without a departure from the principle on which the invention is based.

I claim:—

1 Means for making lantern slides for advertising purposes comprising in combination, an original-carrier with recesses arranged thereon in a curve, originals arranged in said recesses, means for supporting said carrier, means for holding it applied against said supporting means, a source of light disposed for illuminating said originals, a camera opposite said carrier and a plate holder and a sensitive layer in said camera.

2. Means for making lantern-slides for advertising purposes comprising in combination, an original carrier with recesses arranged thereon in a circle, originals arranged in said recesses, means for supporting said carrier, mean for holding it applied against said supporting means, a source of light disposed for illuminating said originals, a camera opposite said carrier and a plate holder and a sensitive layer in said camera.

In testimony whereof I affix my signature in presence of two witnesses.

F. J. HERING.

Witnesses:
WILLIAM H. MATHIE,
DORA GRAF.